United States Patent Office 3,246,036
Patented Apr. 12, 1966

3,246,036
PRODUCTION OF 2-CYCLOHEXYLCYCLO-
HEXANONE
Leon O. Winstrom, East Aurora, N.Y., Jack M. Becker, Petersburg, Va., and Jong Chul Park, Buffalo, N.Y., assignors to Allied Chemical Corporation, New York, N.Y., a corporation of New York
No Drawing. Filed Feb. 28, 1963, Ser. No. 261,863
2 Claims. (Cl. 260—586)

This invention relates to a novel process for the production of 2-cyclohexylcyclohexanone.

2-cyclohexylcyclohexanone, although not a large tonnage commodity finds importance for use as a flavoring agent, an insect repellent and perfume fixative, and has heretofore been prepared by a variety of procedures. In one such procedure 2-cyclohexylcyclohexanone is prepared by passing cyclohexanol vapors over a catalyst consisting of a mixture of the chromites of zinc, copper and cadmium. In another procedure, 2-cyclohexylcyclohexanone is prepared by liquid-phase dehydrogenation of cyclohexylcyclohexanol in the presence of a copper chromite catalyst.

It is an object of the present invention to provide another method for producing 2-cyclohexylcyclohexanone.

We have discovered that 2-cyclohexylcyclohexanone can be produced in small but nevertheless commercially recoverable amounts by passing hydrogen in contact with phenol in the presence of palladium catalyst at a temperature within the range of from 150° C. to 250° C. preferably 175° C. to 225° C. for a sufficient length of time to convert the phenol to 2-cyclohexylcyclohexanone and concomitantly cyclohexanone and cyclohexanol, separating the cyclohexanone and cyclohexanol from the reaction mixture leaving as residue a mixture containing usually more than 50% by weight 2-cyclohexylcyclohexanone with the remainder substantially all high boiling constituents less volatile than cyclohexanone and cyclohexanol and separating and recovering substantially pure 2-cyclohexylcyclohexanone from the residue by fractional distillation under reduced pressure, e.g., from about 5 to 50 mm. Hg absolute pressure. The resultant light yellow distillate, substantially pure cyclohexylcyclohexanone is recovered in good yields up to about 75% or more based on the weight of the 2-cyclohexylcyclohexanone in the residue. If an especially light color 2-cyclohexylcyclohexanone product is desired the 2-cyclohexylcyclohexanone product of the process may be contacted with absorbent charcoal for example, under agitation at ambient temperature for about 30 minutes and the mixture filtered to remove the charcoal.

The operation may be conducted in a batch or continuous manner and may be simply and conveniently carried out in a reaction chamber equipped with an agitator and heat control means such as a jacket around the agitator through which heating or cooling fluid may be passed. To the phenol contained in the reaction chamber is added a palladium catalyst which may be finely divided or colloidal palladium but preferably palladium deposited upon an inert carrier such as alumina or carbon. The catalyst may be promoted by the addition of small amounts of alkaline compounds such as sodium carbonate and sodium hydroxide. The quantity of catalyst is not critical and may vary for example from 0.1 part to an excess of 10 parts for each thousand parts by weight of phenol charged. The catalyst should be in sufficiently finely divided form to be readily dispersed throughout the body of phenol by the agitator in the reaction chamber. The mixture of phenol and catalyst is heated to a temperature above 150° C. preferably within the range of 175-225° C. Although the operation can be conducted under substantially atmospheric pressure or below, more efficient operation is obtained under superatmospheric pressure preferably within the range of about 20 to 300 p.s.i.g. desirably about 35 to 150 p.s.i.g. Hydrogen is introduced into a body of phenol containing dispersed catalyst maintained at a temperature above 150° C. The reaction of hydrogen with the phenol produces cyclohexanone and cyclohexanol and continued introduction of hydrogen produces the desired product 2-cyclohexylcyclohexanone. The amount of 2-cyclohexylcyclohexanone in the reaction products may be determined by periodically withdrawing samples from the body of phenol undergoing conversion in the reaction vessel and analyzing the samples for 2-cyclohexylcyclohexanone. The reaction need not be conducted for high percentages of conversion to 2-cyclohexylcyclohexanone and in fact conversion of 0.5 percent or more of 2-cyclohexylcyclohexanone based on the weight of the reaction products preferably 1–5% have been found adequate and satisfactory for practical commercial operation. This is due to the fact that the other products cyclohexanone and cyclohexanol are also valuable commercial products and the degree of conversion will be course be governed by the economic situation namely the relative value of the products at the time of manufacture. After completion of the reaction to say a production of 1–2% by weight of 2-cyclohexylcyclohexanone based on the weight of the reaction products, the reaction products composed primarily of a mixture of 2-cyclohexylcyclohexanone, high boiling non-volatile constituents, cyclohexanone and cyclohexanol are separated from the catalyst by filtration. Then the cyclohexanol and cyclohexanone produced in the reaction together with unreacted phenol, if any, may be conveniently separated from the reaction medium by distillation to yield a residue rich in 2-cyclohexylcyclohexanone, e.g., usually more than about 50% by weight. The crude 2-cyclohexylcyclohexanone recovered in our process can be purified by fractional distillation. The distillation is carried out at a pressure below about 50 mm. mercury absolute to avoid decomposition of the product. The fractionation may be carried out at pressure of 5 mm. mercury absolute or less but use of such pressures in large scale installations requires costly distillation equipment and hence is less desired. Generally an excellent result is obtained by rectifying crude 2-cyclohexylcyclohexanone at a pressure of about 10 mm. mercury absolute. The temperature range over which the 2-cyclohexylcyclohexanone distills will, of course, vary with the pressure employed in the distillation. For example, 2-cyclohexylcyclohexanone distills at a temperature of about 114 to 116° C. at 5 mm. Hg, at about 135–140° C. at 10 mm. Hg and at about 184 to 194° C. at 50 mm.

The purification of 2-cyclohexylcyclohexanone by fractional distillation requires conditions, i.e., reflux ratio, column efficiency, etc., known or easily ascertainable by persons skilled in the art. For example, the batchwise distillation of crude 2-cyclohexylcyclohexanone in a 20 plate column under the foregoing conditions of temperature and pressure yields a 2-cyclohexylcyclohexanone distillate of excellent purity by employing a reflux ratio of about 5:1 or greater during the distillation of the last 50 to 60% weight fraction of the total low boiling impurities present in the crude and a reflux ratio of about 2:1 or greater during the balance of the distillation.

If desired, the fractional distillation of the crude 2-cyclohexylcyclohexanone may be carried out in a series of two fractionating columns operated in a continuous fashion. In this manner, low boiling impurities are distilled as overhead in the first column and the bottoms obtained are transferred to the second column wherein the 2-cyclohexylcyclohexanone is distilled. Accordingly, the present method is readily adaptable to large scale production of 2-cyclohexylcyclohexanone.

The following examples illustrate the present invention, parts and percentages are by weight and temperatures are in degrees centigrade.

Exampe I

A mixture of 1000 parts of phenol, which contains less than 1 p.p.m. of soluble iron, less than 10 p.p.m. of sulfur, less than 10 p.p.m. combined halogen and a 16.5% solutoon of which in aqueous alcohol has a pH of 5.5, 0.01 part of sodium carbonate and 1 part of finely divided catalyst composed of 5% palladium on charcoal promoted with 5000 p.p.m. sodium, was charged to a stainless steel reaction vessel. The mass was heated to 185° C. and agitated at that temperature as hydrogen was admitted through a diffuser located near the bottom of the vessel and at a rate sufficient to maintain a pressure of 70 p.s.i.g. After 150 minutes the contents of the reactor were discharged through a filter to remove the dispersed catalyst. Cyclohexanone and cyclohexanol were removed by distillation and the still residue was retained.

The foregoing process was repeated substantially as described until a total of 1402 parts of still residue was obtained.

This residue was fractionally distilled in a 20 plate Oldershaw column under a pressure of 10 mm. mercury at a reflux ratio of about 5:1. When the temperature of the column head reached 117°, after distillation of 176.0 parts of low boiling impurities, the reflux ratio was adjusted to 10:1. At a head temperature of 134°, after distillation of an additional 217.3 parts of low boiling impurities the reflux ratio was set again at 5:1. The product fraction (775.8 parts, 77.2% yield based on the weight of 2-cyclohexylcyclohexanone in the charge) distilled at 135 to 140°. The light yellow distillate contained 97.7% 2-cyclohexylcyclohexanone and had a platium-cobalt color rating of 70 ("Methods of Analysis of Petrochemicals," E. R. Littmann, Editor, Enjay Co., Inc., New York, N.Y., 1958, p. 135).

Example II

The following example illustrated the decolorization of 2-cyclohexylcyclohexanone.

A 423.6 part sample of 2-cyclohexylcyclohexanone prepared substantially as described in Example 1 had an initial platinum cobalt color rating of 50. On standing for two weeks at ambient temperature, the sample darkened in color and the platinum cobalt color rating increased to 250. The sample was agitated with 85 parts of activated charcoal ("Darco" 4 x 12, mesh, Atlas Powder Co.) for 30 minutes at ambient temperature. Removal of the charcoal by filtration yielded 2-cyclohexyl- cyclohexanone with a substantially lighter color and a platinum cobalt color rating of 150.

The foregoing examples illustrate our invention, but it will be obvious to those skilled in the art that numerous modifications can be made in the details set out therein without departing from the spirit or scope of the invention.

We claim:
1. A process for the production of 2-cyclohexylcyclohexanone which comprises passing hydrogen in contact with phenol in the presence of palladium catalyst at a temperature within the range of from 150° C. to 250° C. for a sufficient length of time to convert the phenol to 2-cyclohexylcyclohexanone and concomitantly cyclohexanone and cyclohexanol, separating the reaction mixture from the catalyst, distilling the cyclohexanone and cyclohexanol from the reaction mixture leaving as residue a mixture containing 2-cyclohexylcyclohexanone with the remainder substantially all high boiling constituents less volatile than cyclohexanone and cyclohexanol and fractionally distilling under sub-atmospheric pressure the residue to remove as overhead the more volatile low boiling impurities and thereafter continuing the distillation at a temperature of 114° to 194° C. and at a pressure of 5 to 50 mm. of Hg to remove a fraction containing predominantly 2-cyclohexylcyclohexanone.

2. A process for the production of 2-cyclohexylcyclohexanone which comprises passing hydrogen in contact with phenol in the presence of palladium catalyst at a temperature within the range of from 175° C. to 225° C. for a sufficient length of time to convert the phenol to 2-cyclohexylcyclohexanone in an amount of 0.5–5% by weight of the reaction mixture and concomitantly cyclohexanone and cyclohexanol, separating the reaction mixture from the catalyst, distilling the cyclohexanone and cyclohexanol from the reaction mixture leaving as residue a mixture containing at least 50% by weight 2-cyclohexylcyclohexanone with the remainder substantially all high boiling constituents less volatile than cyclohexanone and cyclohexanol and fractionally distilling under subatmospheric pressure the residue to remove as overhead the more volatile low boiling impurities and thereafter continuing the distillation at a temperature of 114° to 194° C. and at a pressure of 5 to 50 mm. of Hg. to remove as vapor substantially pure 2-cyclohexylcyclohexanone.

References Cited by the Examiner
UNITED STATES PATENTS

| | | | |
|---|---|---|---|
| 2,829,166 | 4/1958 | Joris et al. | 260—586 |
| 2,857,432 | 10/1958 | Joris | 260—586 |
| 3,076,810 | 2/1963 | Duggan | 260—586 |

LEON ZITVER, *Primary Examiner.*